(12) United States Patent
Andrews et al.

(10) Patent No.: US 12,730,861 B2
(45) Date of Patent: Sep. 8, 2026

(54) MICROSERVICE POINT-OF-USE INTERFACE FOR AN INFORMATION HANDLING SYSTEM

(71) Applicant: Dell Products L.P., Round Rock, TX (US)

(72) Inventors: Maxwell S. Andrews, Kennett Square, PA (US); Robert C. Hernandez, Morrisville, NC (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/423,225

(22) Filed: Jan. 25, 2024

(65) Prior Publication Data

US 2025/0245299 A1 Jul. 31, 2025

(51) Int. Cl.
*G06F 21/10* (2013.01)
*H04L 67/10* (2022.01)

(52) U.S. Cl.
CPC ............ *G06F 21/105* (2013.01); *H04L 67/10* (2013.01)

(58) Field of Classification Search
None
See application file for complete search history.

(56) References Cited

U.S. PATENT DOCUMENTS 8,346,563 B1 * 1/2013 Hjelm ................. G10L 15/1822 704/251
9,578,088 B2 * 2/2017 Nickolov ............ H04L 67/1021

(Continued)

FOREIGN PATENT DOCUMENTS

WO WO-2019172946 A1 * 9/2019 ......... G06F 16/3344
WO WO-2020140230 A1 * 7/2020 ............. G06F 21/64
WO WO-2021044363 A1 * 3/2021 ........... G06Q 30/018

OTHER PUBLICATIONS

Cheonsu Jeong et al. "A Study on the Implementation of Generative AI Services Using an Enterprise Data-Based LLM Application Architecture." (2023). Retrieved online Jul. 11, 2025. https://www.oajaiml.com/uploads/archivepdf/94881191.pdf (Year: 2023).*

(Continued)

*Primary Examiner* — James A Reagan
(74) *Attorney, Agent, or Firm* — Norton Rose Fulbright US LLP

(57) ABSTRACT

An information handling system may host a single, common interface through which users may browse, select, purchase, and use software services offered on more than one cloud computing platform. An information handling system configured as such may receive a user request to perform an action; determine a list of software functions configured to perform that action offered on a plurality of cloud computing platforms using an application programing interface (API) configured to integrate with the platforms; retrieve licensing term options covering the use of each software function to perform the action; transmit previews of each software function performing the action; receive a selection from the user of a selected software function, an associated licensing term option, and payment details in accordance with the selected licensing term option; and cause the action to be completed by the selected software function using the API in response to receiving the payment details.

17 Claims, 8 Drawing Sheets

(56) References Cited

U.S. PATENT DOCUMENTS 10,068,174 B2 * 9/2018 Aili ........................ G06F 9/445
10,446,143 B2 * 10/2019 Akbacak ............... G06F 40/166
10,489,433 B2 * 11/2019 Wieweg .................. G06F 16/22
10,679,605 B2 * 6/2020 Gruber .................... G10L 13/00
10,679,615 B2 * 6/2020 Chao ................... G10L 15/1822
11,184,252 B2 * 11/2021 Clarke .................... H04L 41/28
11,367,447 B2 * 6/2022 Pair ..................... G10L 15/1815
11,775,891 B2 * 10/2023 Brown ................ G06F 16/9535 705/7.12
12,346,243 B2 * 7/2025 Srivastava ............. G06N 3/044
2013/0124372 A1 * 5/2013 Bouw .................... G06Q 30/04 705/26.1
2013/0268260 A1 * 10/2013 Lundberg ................ G06F 40/58 704/8
2014/0019116 A1 * 1/2014 Lundberg .......... G06F 16/90332 704/8
2015/0339376 A1 * 11/2015 Wieweg .............. G06F 16/3329 717/145
2017/0262825 A1 * 9/2017 Conway ................ G06F 21/105
2018/0089572 A1 * 3/2018 Aili ......................... G06F 9/453
2018/0186311 A1 * 7/2018 Mason .................... H04W 4/44
2018/0314809 A1 * 11/2018 Mintz ................... G06F 21/105
2019/0042988 A1 * 2/2019 Brown ................ G06F 16/9535
2020/0097495 A1 * 3/2020 Gupta ................. G06F 16/3344
2020/0134585 A1 * 4/2020 Xu ........................ H04L 9/3236
2020/0220791 A1 * 7/2020 Aiello ................. G06F 9/45558
2020/0242145 A1 * 7/2020 Wieweg .................. G06F 40/20
2020/0311347 A1 * 10/2020 Theobald ................ G06F 40/35
2021/0374693 A1 * 12/2021 La Salle ............ G06Q 20/0655
2021/0383800 A1 * 12/2021 Pair ......................... G10L 15/22
2022/0020062 A1 * 1/2022 Freeman ............ G06Q 30/0269
2022/0051211 A1 * 2/2022 Xu ........................ H04L 9/3236
2023/0245102 A1 * 8/2023 Mistele ................ G06Q 20/405 705/66
2023/0419283 A1 * 12/2023 Le .......................... G06Q 30/04
2025/0068627 A1 * 2/2025 Hoang .............. G06F 16/24573
2025/0123814 A1 * 4/2025 Mcmorran ................ G06F 8/75
2025/0185998 A1 * 6/2025 Nimmich ............. A61B 5/6829

OTHER PUBLICATIONS

Dell Technologies Solutions. “Generative AI in the Enterprise.” (May 2023). Retrieved online Jul. 11, 2025. https://infohub.delltechnologies.com/static/media/client/7phukh/DAM_88745fcb-8e2b-46ce-9680-284da15ce94a.pdf (Year: 2023).*

FSB. “Artificial intelligence and machine learning in financial services.” (Nov. 1, 2017). Retrieved online Jul. 11, 2025. https://www.fsb.org/uploads/P011117.pdf (Year: 2017).*

* cited by examiner

MICROSERVICE POINT-OF-USE INTERFACE FOR AN INFORMATION HANDLING SYSTEM

FIELD OF THE DISCLOSURE

The instant disclosure relates to information handling systems. More specifically, portions of this disclosure relate to interfacing with cloud computing platforms by an information handling system to provide software services to a user.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. One such application for information handling systems is providing cloud computing services.

SUMMARY

In aspects of this disclosure, cloud computing service providers may provide functionality on a pay-per-use scheme for customers who may have only occasional utility for said services. These services may be incorporated into and/or accessed by consumers through artificial intelligence (AI) assistants, which may increase the frequency at which consumers discover that cloud computing services may offer the software solutions to their single-instance or limited-term problems. An information handling system may incorporate application programming interfaces (APIs) configured to integrate with cloud computing platforms such that the information handling system may search cloud computing platforms for software function offered on the platforms and provide use of those functions to a user. Using APIs configured to integrate with a plurality of cloud computing platforms, an information handling system may host a single, common interface through which users may browse, select, purchase, and use software services offered on more than one cloud computing platform, thereby providing a point-of-use terminal well-suited for use by consumers looking to use those software services for single-instance or limited-term uses (i.e., microservices).

According to one embodiment, a method for execution by an information handling system includes receiving a request from a user to perform an action; determining a list of one or more software functions, configured to at least partially perform the action, of a plurality of cloud computing platforms using an application programming interface (API) configured to integrate with each of the plurality of cloud computing platforms; retrieving from the plurality of cloud computing platforms, using the API, one or more licensing term options associated with each of the one or more software functions, wherein each of the one or more licensing term options pertains to a use of an associated software function to at least partially perform the action; transmitting one or more previews of outputs resulting from each of the one more software functions at least partially performing the action; receiving, from the user, a first selection of at least one selected software function from the list of the one or more software functions and a second selection of a selected licensing term option from the one or more licensing term options associated with the at least one selected software function; receiving, from the user, payment details in accordance with the second selection; and causing the action to be at least partially performed by the at least one selected software function using the API in response to receiving the first selection and the payment details.

In some embodiments, the method may further include displaying a list of one or more potential actions and wherein receiving the request to perform the action comprises receiving, from the user, a selection of the action from the list of the one or more potential actions.

In some embodiments, the method may further include receiving, from the user, a natural language description of a desired action; determining, using an inference engine, one or more probable actions each having a probability of matching the desired action that surpasses a probability threshold; and generating the list of the one or more potential actions such that the one or more potential actions comprise the one or more probable actions.

In some embodiments, the list of the one or more software functions may be curated based on at least one known preference of the user for a preferred software function publisher, a history of software functions selected by the user, or a combination thereof.

In certain embodiments, the action may comprise a natural language description of a software design pattern. In some embodiments, the one or more previews may comprise code-implementation examples of the software design pattern having imposed utility limitations that may be retrieved from the plurality of cloud computing platforms using the API.

In some embodiments, the method may further include receiving, from the user, target content on which the action is to be at least partially performed, wherein the information handling system causes the action to be at least partially performed on a full resolution version of the target content by the at least one selected software function using the API in response to receiving the first selection and the payment details; and generating each of the one or more previews, prior to receiving the first selection and the payment details, by causing, using the API, the action to be at least partially performed on a reduced resolution version of the target content by each of the one or more software functions in a virtual environment.

In certain embodiments, the target content may comprise a digital image and the action may comprise applying a visual effect filter to the digital image.

In some embodiments, the target content may comprise a digital document and the action may comprise applying an electronic signature to the digital document.

In certain embodiments, at least one of the one or more previews may be configured to update dynamically in response to one or more tuning inputs received from the user.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1A:
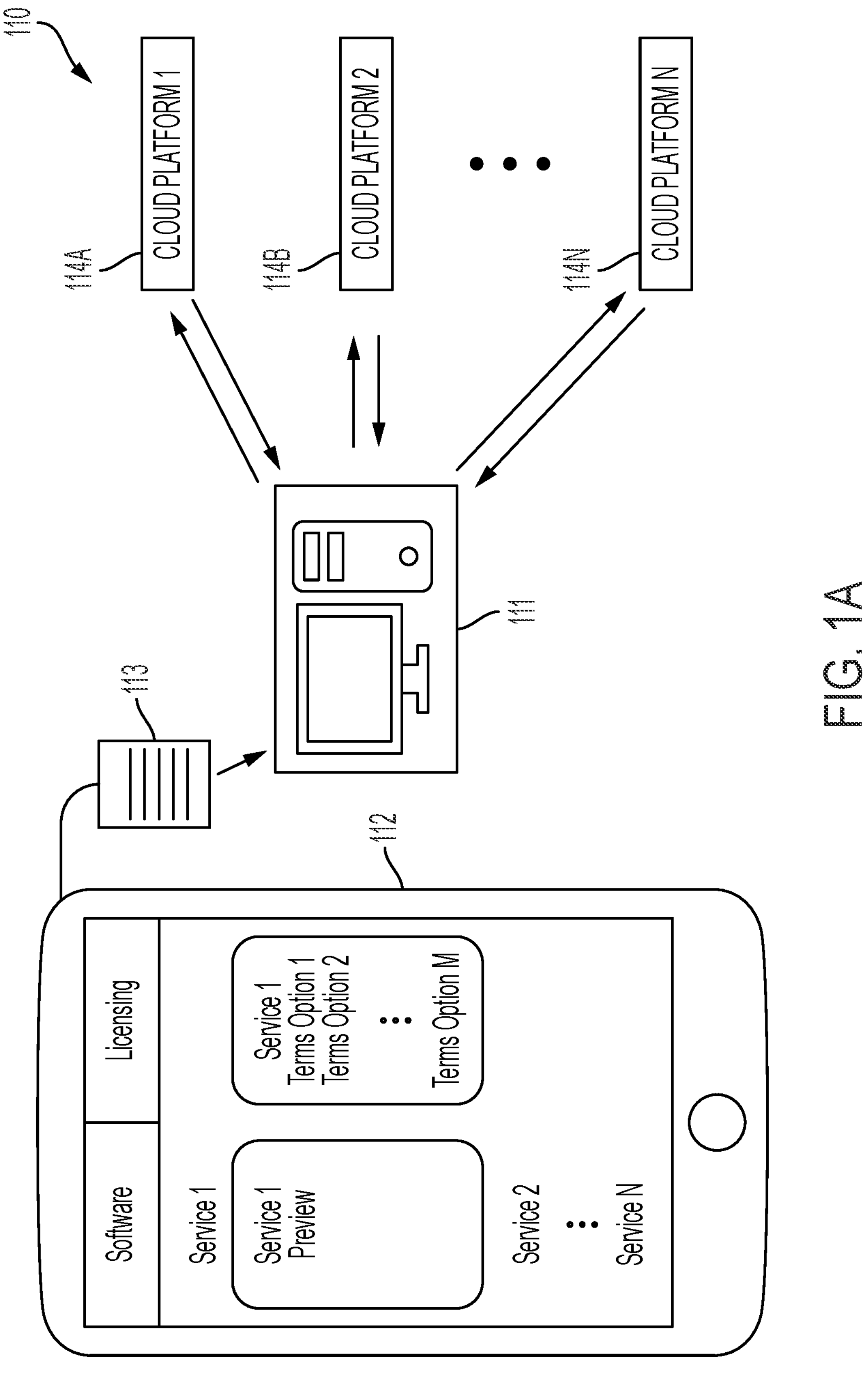
FIG. 1A is a schematic block diagram of an information handling system configured to implement a single, common interface through which users may browse, select, purchase, and use software services offered on a plurality cloud computing platforms according to some embodiments of the disclosure.

An information handling system may include a variety of components to generate, process, display, manipulate, transmit, and receive information. FIG. 1A is a block diagram illustrating one example of an information handling system 110. System 110 may include at least one server 111. Server 111 may be configured to transmit and receive information to and from a plurality of cloud computing platforms 114A-114N offered by a plurality of cloud computing services (e.g., Azure, Amazon Web Services (AWS), Zapier, Make). Server 111 may also be configured to transmit and receive information, such as electronic file 113, to and from one or more user device(s), such as user device 112. Electronic file 113 may comprise files including, but not limited to, digital documents, digital images, video files, or audio files. User device 112 may comprise devices including, but not limited to, mobile devices (e.g., smart phones), wearable devices (e.g., smart watches), or personal computers (e.g., desktops, laptops). As illustrated in FIG. 1A, in some embodiments, user device 112 may be configured to act as an interface through which a user may use system 110 to browse, select, purchase, and use services offered on cloud computing platforms 114A-114N.

Figure 1B:
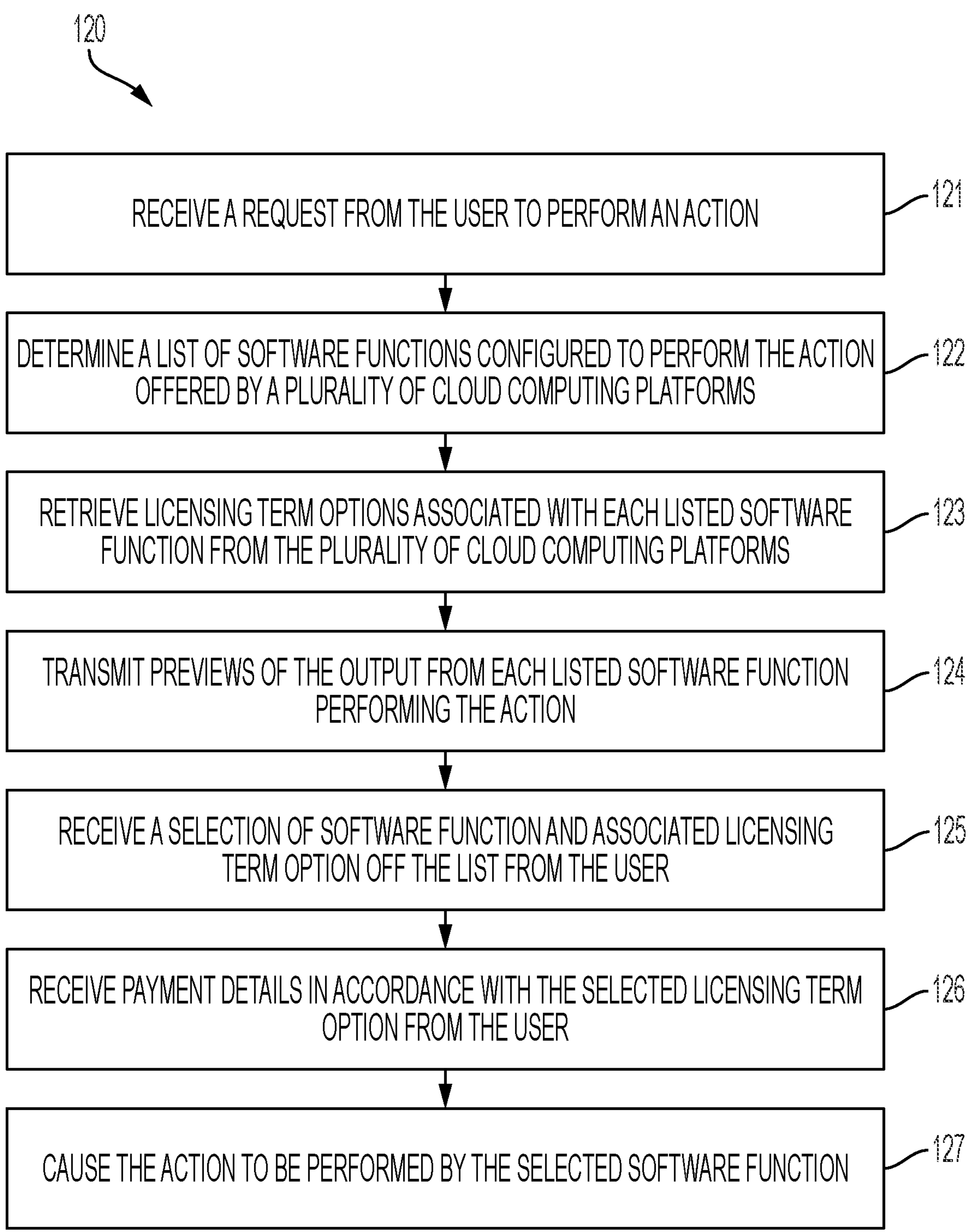
FIG. 1B is an operational flow diagram illustrating a method of interfacing with a plurality of cloud computing platforms to browse, select, purchase, and use services offered therein via a single point-of-use platform according to some embodiments of the disclosure.

FIG. 1B is an operational flow diagram illustrating a method 120 of interfacing with a plurality of cloud computing platforms to browse, select, purchase, and use services offered therein via a single point-of-use platform. Method 120 may be implemented using an information handling system such as system 110 described above. Method 120 may begin at block 121 with system 110 receiving a request from a user to perform an action. In some embodiments, the request to perform an action may be received via user device 112 and then transmitted to server 111. The action requested to be performed may comprise actions including, but not limited, to applying a visual effect filter to a digital image, applying an electronic signature to a digital document, implementing a software design pattern (e.g., a unit of work pattern), or a combination thereof.

At block 122, system 110 may determine a list of software functions that are configured to perform the requested action. In some embodiments, system 110 may determine the list of functions by compiling software functions offered by computing platforms from the plurality of computing platforms 114A-114N. System 110 may utilize an application programming interface (API) configured to integrate with each of the plurality of cloud computing platforms 114A-114N in order to search each cloud computing platform for offered software functions configured to perform the action and then compile those functions into the list. Accordingly, the list of software functions may include functions offered by two or more cloud computing platforms of the plurality of platforms 114A-114N. Additionally, the list of software functions may include functions offered by some of the cloud computing platforms from platforms 114A-114N but not others to the extent that the others do not offer any software functions configured to perform the action (e.g., the list may include software functions offered by platform 114A and 114N but none from platform 114B). In some embodiments, server 111 may determine the list of software functions using an API configured to integrate with plurality of cloud computing platforms 114A-114N and server 111 may transmit the list of software functions to user device 112 such that user device 112 may display the list of functions (e.g., Service 1-N of FIG. 1) to the user.

At block 123, system 110 may retrieve one or more licensing term options associated with each of the listed software functions from the cloud computing platforms 114A-114N. Each of the one or more licensing term options retrieved may pertain to the use of an associated software function to perform or partially perform the action. Specifically, a licensing term option may include any licensing terms to which the cloud computing service offering the associated software function may require a user to agree in exchange for the permission to use the software function to perform or partially perform the action. In some embodiments, system 110 may retrieve more than one different licensing term options associated with a listed software function. Moreover, system 110 may retrieve one licensing term option for some listed software functions and more than one licensing term options for other listed software functions, based on how may licensing term options an associated cloud computing service offers for a listed software function pertaining to performing or partially performing the action.

In some embodiments, server 111 may retrieve the license term options from cloud computing platforms 114A-114N using an API configured to integrate with plurality of cloud computing platforms 114A-114N and server 111 may transmit the licensing term options to user device 112 such that user device 112 may display the licensing term options to the user. User device 112 may display one or more licensing term options associated with each listed software function (e.g., terms options 1-M of FIG. 1) proximate to the associated software function, as shown in FIG. 1.

In some embodiments, server 111 may determine (e.g., by using an API configured to integrate with plurality of cloud computing platforms 114A-114N) that a cloud computing service associated with a listed software function may offer one or more licensing term options that bundle together the use of two or more listed software functions to perform or partially perform the action and may transmit that determination to user device 112. User device 112 may reorganize the list of software functions displayed to the user so as to group together listed software functions that may be bundled together under one or more licensing term option. In some embodiments, sever 111 may determine (e.g., by using an API configured to integrate with plurality of cloud computing platforms 114A-114N) that a particular user or a particular user's organization (e.g., a user's employer) has already purchased permission to use the one or more of the listed software functions to perform or partially perform the action (i.e., already purchased one or more of the licensing term options) and may transmit that determination to user device 112. User device 112 may display indications as to which licensing term options the user or the user's organization has already purchased and may reorganize the list of software functions displayed to the user so as to prioritize software functions for which licensing term options have already been purchased. Additionally, in some embodiments, system 110 may curate the list of software functions based on at least one known preference of the user for a preferred software function publisher (e.g., preferred cloud computing service, preferred cloud computing platform), a history of software functions selected by the user, or a combination thereof.

At block 124, system 110 may transmit one or more previews of outputs resulting from each of the listed software functions performing or partially performing the action. In some embodiments, system 110 may generate the previews. For example, server 111 may generate previews associated with each listed software function, transmit the previews to user device 112, and user device 112 may display the preview(s) associated with each listed software function proximate to the associated software function, as shown in FIG. 1. In some embodiments, system 110 may retrieve one or more previews associated with one or more listed software functions from cloud computing platforms 114A-114N. For example, server 111 may retrieve, using an API configured to integrate with plurality of cloud computing platforms 114A-114N, previews from platforms 114A-114N, transmit the previews to user device 112 to display to a user.

At block 125, system 110 may receive, from a user, a selection of at least one selected software function from the listed software functions and a selection of a selected licensing term option associated with the selected software function. For example, in some embodiments, a user may select a listed software function and an associated licensing term option via user device 112 (e.g., using a touch screen, mouse, keyboard, voice command, or combination thereof) and user device 112 may transmit the selection to server 111. In some embodiments, a user may select more than one listed software function at a time as well as a licensing term option for each selected software function. Additionally, in some embodiments, a user may select more than one listed software function and one licensing term option that bundles together use of the selected software functions to perform or partially perform the action.

At block 126, system 110 may receive payment details from a user in accordance with the selected licensing term option(s). For example, in some embodiments, in response to receiving a selection of licensing term option(s), user device 112 may prompt a user for payment details (e.g., name, organization name, credit card number, billing address, email address, phone number, or a combination thereof), receive the requested payment details, and transmit the payment details to server 111. Server 111 may transmit payment details received from user device 112 to the cloud computing platform(s) associated with the one or more selected software function(s). In some embodiments, server 111 may receive at least one confirmation that the payment details were received by the cloud computing platform(s) associated with the one or more selected software function(s).

At block 127, system 110 may cause the action to be performed or partially performed by the one or more selected software function(s). For example, in some embodiments, server 111 may receive one or more file(s) (e.g., source code) which implement the selected software function from the cloud computing platform(s) associated with the selected software function(s) (e.g., by using an API configured to integrate with plurality of cloud computing platforms 114A-114N). Server 111 may receive one or more electronic file(s) 113 from user device 112 and server 111 may apply the received files which implement the selected software function to file(s) 113 such that the action is performed or partially performed on file(s) 113. In some embodiments, server 111 may transmit received file(s) which implement the selected software function to user device 112 and user device 112 may apply the received files to content received from a user so as to perform or partially the action. In some embodiments, server 111 may receive file(s) 113 from user device 112, retransmit file(s) 113 to the cloud computing platform(s) associated with the selected software function(s) (e.g., by using an API configured to integrate with plurality of cloud computing platforms 114A-114N), which may cause the action to be performed or partially performed on file(s) 113, and then files comprising the output of performance or partial performance of the action on file(s) 113 using the selected software function(s) may be received by server 111 from the a the cloud computing platform(s) associated with the selected software function(s). In some embodiments, system 110 may cause the action to be performed or partially performed by removing imposed utility limitations (e.g., watermark(s), reduced resolution, increased latency, rate limits) from the one or more preview(s) associated with the selected software function(s).

Figure 2:
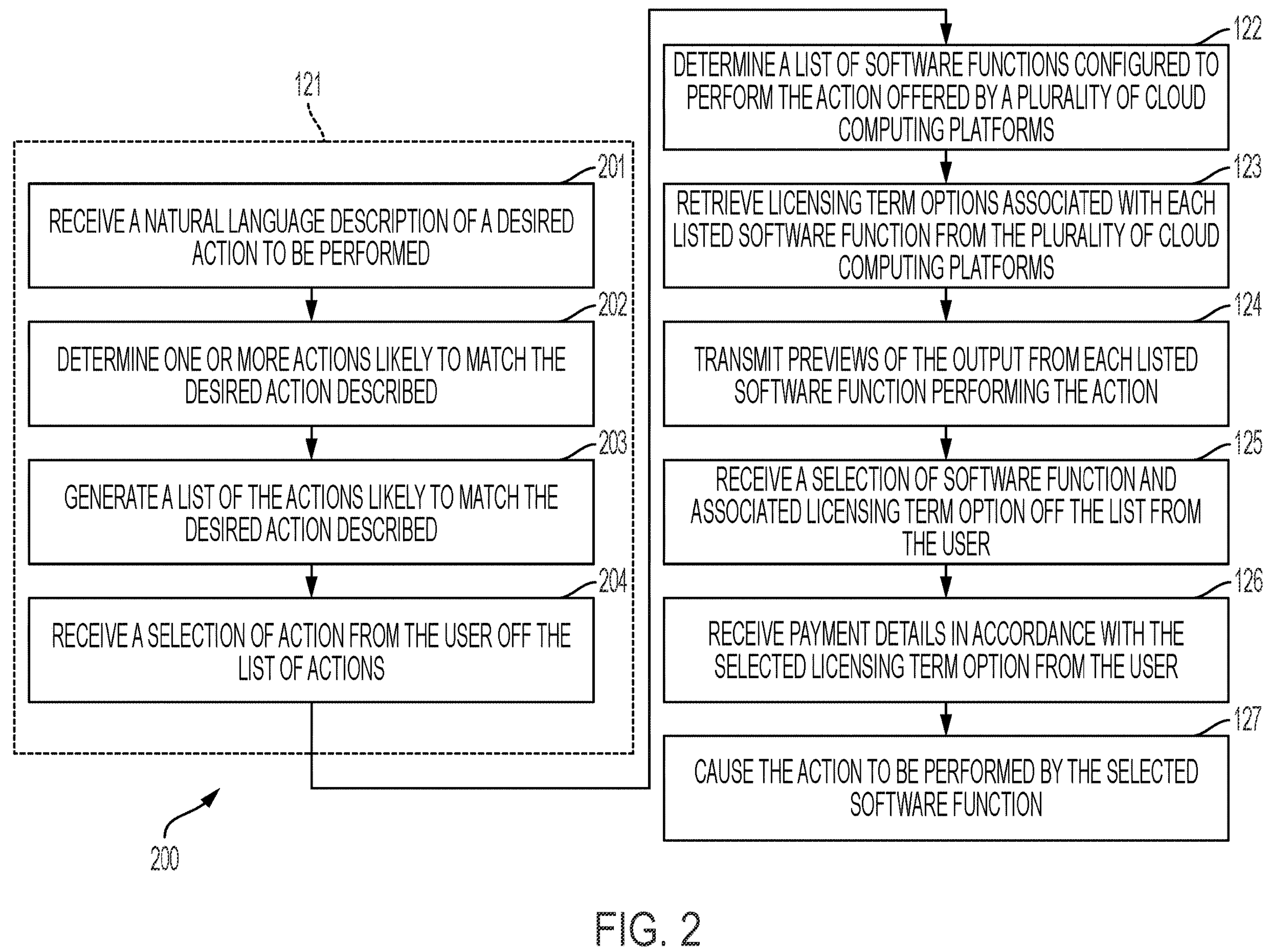
FIG. 2 is an operational flow diagram illustrating an alternative method for interfacing with a plurality of cloud computing platforms utilizing predictive filtering regarding the action requested to be performed according to some embodiments of the disclosure.

FIG. 2 is an operational flow diagram illustrating a method 200 that is an example of an alternate embodiment of method 120. In method 200, block 121 of method 110 may further comprise blocks 201-204. At block 201, system 110 may receive from a user the request to perform the action in the form of a natural language description of the desired action to be performed. For example, in some embodiments, a user may input (e.g., using a touch screen, mouse, keyboard, voice command, or combination thereof) a natural language description into user device 112 and user device 112 may transmit the description to server 111.

At block 202, system 110 may determine one or more probable actions that each have a probability of matching the described desired action to be performed beyond a probability threshold. For example, in some embodiments, server 111 may utilize an inference engine implementing one or more machine learning algorithms to determine actions having a probability of matching the described desired action beyond a probability threshold.

Machine learning algorithms or models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received data (e.g., historical data of actions requested by a particular user, by a typical user, by users across an organization, attributes of a particular user such as job function, or a combination thereof), and a system, such as a particular user, and/or a degree to which such an influencing attribute affects the outcome of such a system (e.g., determination of action(s) likely to match a described desired action received from a particular user).

In some embodiments, the probability threshold may be manually entered by a user, set by system 110 based on fields manually completed by the user, set by the system 110 without any direct input by the user (e.g., based on user habits and/or attributes using a machine learning algorithm), or a combination thereof. In some embodiments, the probability threshold may be a static value. In other embodiments, the probability threshold may vary dynamically based on historical data of actions requested by a particular user, by a typical user, by users across an organization, attributes of a particular user such as job function, preferences indicated by a particular user, or a combination thereof.

At block 203, system 110 may generate a list of actions determined likely to match the described desired action beyond the probability threshold. For example, server 111 may compile a list of potential actions comprising actions determined likely to match the described desired action beyond the probability threshold, transmit the list to user device 112, and user device 112 may display the list of potential actions to the user.

At block 204, system 110 may receive from a user a selection of action to be performed from the list of one or more potential actions generated at block 203. For example, the user may input a selection of action from the list of potential actions via user device 112 (e.g., using a touch screen, mouse, keyboard, voice command, or combination thereof) and user device 112 may transmit the user's selection to server 111.

Figure 3:
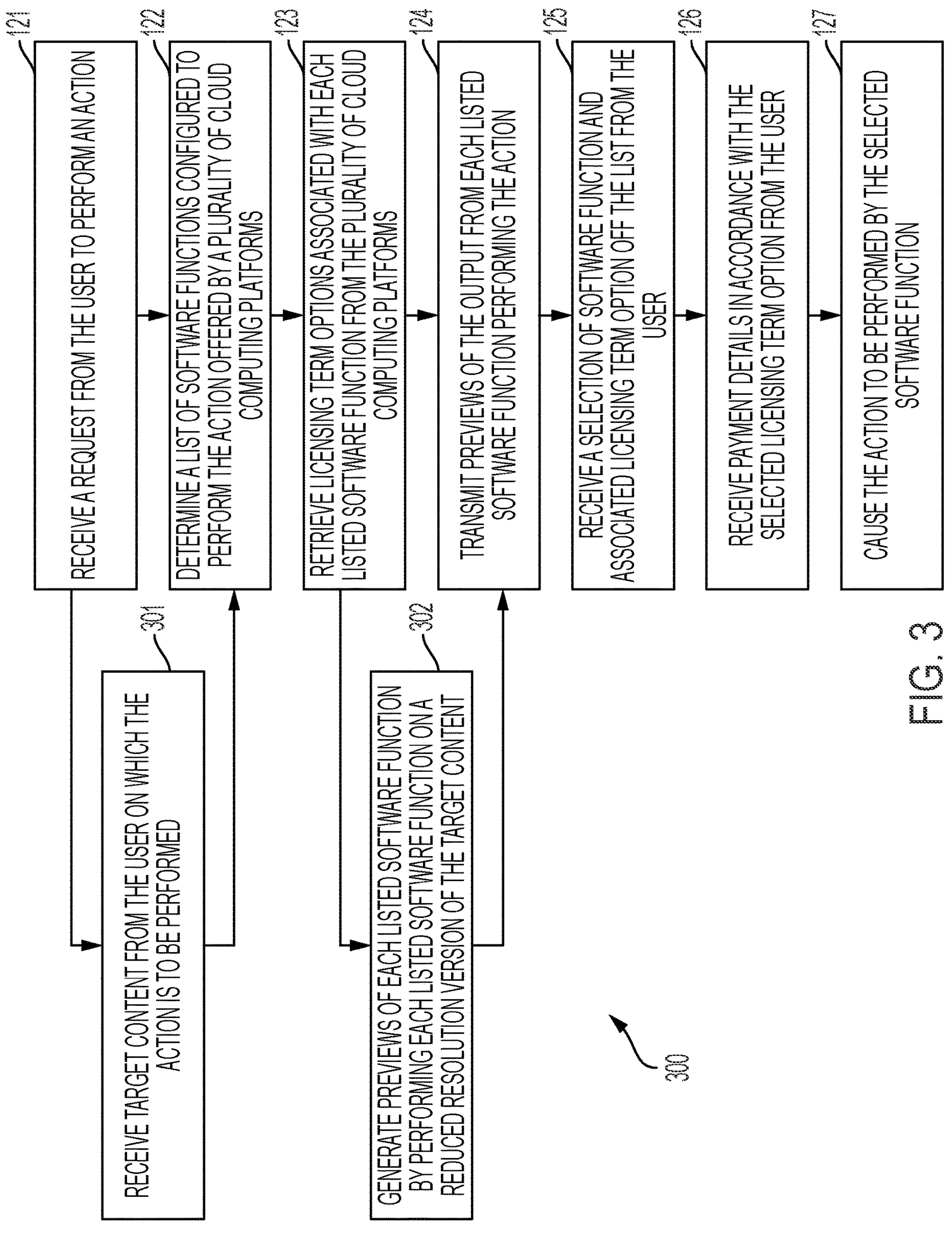
FIG. 3 is an operational flow diagram illustrating an alternative method for interfacing with a plurality of cloud computing platforms that generates previews by applying listed software functions to target content from the user according to some embodiments of the disclosure.

FIG. 3 is an operational flow diagram illustrating a method 300 which is an example of an alternate embodiment of method 120. In method 300, method 110 may further comprise blocks 301 and 302. At block 301, in addition to receiving a request to perform an action from a user as described with regard to block 121 of method 120, system 110 may receive from a user target content on which the action is to be performed or partially performed (e.g., digital document(s), digital image(s), video file(s), audio file(s), or a combination thereof). For example, user device 112 may receive the target content (e.g., via web download, transfer from external storage, composition on user device 112, or a combination thereof) and transmit the target content to sever 111 as file(s) 113.

At block 302, system 110 may generate each of the one or more previews for transmission at block 124 of method 120.

In some embodiments, the system 110 may generate the previews by causing the action to be performed or partially performed, as described above with regard to block 127 of method 120, on a version of the target content having imposed utility limitations (e.g., watermark(s), reduced resolution, increased latency, rate limits) in a virtual environment. In some embodiments, system 110 may generate the previews using utility-limited versions of the target content prior to receiving selections of software function(s), associated licensing term option(s), payment details, or a combination thereof and then may cause the action to be performed, as described above with regard to block 127 of method 120, on full-utility versions of the target content (e.g., no watermark(s), full resolution, no imposed latency, no imposed rate limits) in response to receiving selections of software function(s), associated licensing term option(s), payment details, or a combination thereof.

As an example, in one embodiment, system 110 may receive from a user target content comprising a digital image as well as a request to perform the action of applying a visual effect filter to the digital image. System 110 may receive the request and digital image via user device 112 which may transmit both to server 111. Server 111 may determine a list of visual effect filters offered on a plurality of cloud computing platforms and may retrieve licensing term options associated with the use of the listed visual effect filters as described above with regard to blocks 122-123 of method 120. Server 111 may also generate a low resolution version of the digital image in a virtual environment and may cause each listed visual effect filter to be applied to the low resolution version in the virtual environment to generate previews of the digital image with each listed visual effect filter applied. Server 111 may apply one or more watermarks to each preview. In some embodiments, server 111 may modify one or more of the previews in response to receiving one or more tuning inputs from the user (e.g., to change the brightness or contrast of the preview).

With regard to the above example, server 111 may receive from the user, via user device 112, a selection of a listed visual effect filter, a licensing term option associated with the selected visual effect filter, and payment details in accordance with the selected licensing term option, as described with regard to blocks 125-126 of method 120. In response to receiving the selected visual effect filter and payment details, server 111 may apply the selected visual effect filter to a full resolution version of the digital image and transmit the digital image with the filter applied to user device 112 for display to/use by the user. Additionally, in some embodiments, server 111 may transmit the payment details to the cloud computing platform associated with the selected visual effect filter, receive confirmation of receipt of the payment details by the cloud computing platform, and delay application of the selected visual effect filter to a full resolution version of the digital image until confirmation is received.

As another example, in one embodiment, the target content may comprise one or more digital documents and the requested action to be performed may comprise applying one or more electronic signatures (e-signature) to the digital document(s). Specifically, server 111 may receive from a user, via user device 112, a digital document and a request to apply an e-signature to the digital document. Server 111 may generate a list of applications that apply electronic signatures and retrieve associated licensing term options, as described with regard to blocks 122-123 of method 120. Server 111 may generate a low resolution version of the digital documents in a virtual environment and may cause each listed e-signature applications to each apply signatures to the low resolution version in the virtual environment to generate previews of the signed digital document for each listed application. Server 111 may receive from the user a selection of an listed e-signature application, an associated licensing term option, and payment details in accordance with the selected licensing term option, as described with regard to blocks 125-126 of method 120. In response to receiving a selection of application and payment details, server 111 may cause the selected application to apply an e-signature to a full resolution version of the digital document and transmit the result to user device 112 for use by the user.

As yet another example, in one embodiment, server 111 may receive, from a user via user device 112, a request to perform an action in the form of a natural language description of a software design pattern (e.g., unit of work). Server 111 may determine a list of software functions, as described in block 122 of method 120, including two or more software functions that, independently, each only partially implement the described software design pattern but, in tandem with one another, implement the entire described software design pattern. Server 111 may transmit the natural language description of the software design pattern to each cloud computing platform 114A-114N (e.g., by using an API configured to integrate with plurality of cloud computing platforms 114A-114N) and may receive from platforms 114A-114N previews of each listed software function implementing or partially implementing the described software design pattern. Previews received from platforms 114A-114N may have imposed utility limitations (e.g., watermark (s), reduced resolution, increased latency, rate limits). Server 111 may transmit the previews received from platforms 114A-114N to user device 112 and may implement blocks 125-127 of method 120, as described above.

In some embodiments, causing the action to be performed or partially performed, as described with regard to block 127 of method 120, may comprise server 111 receiving one or more files (e.g., source code) from platforms 114A-114N in which the one or more selected software functions implement or partially implement the described software design pattern without imposed utility limitations and transmitting the one or more files to user device 112 for use by the user. In some embodiments, if two or more selected software functions may implement the software design pattern in tandem with one another, server 111 may generate a file which integrates the two or more selected software functions to do so and may transmit the integrated file to user device 112 for use by the user.

Figure 4A:
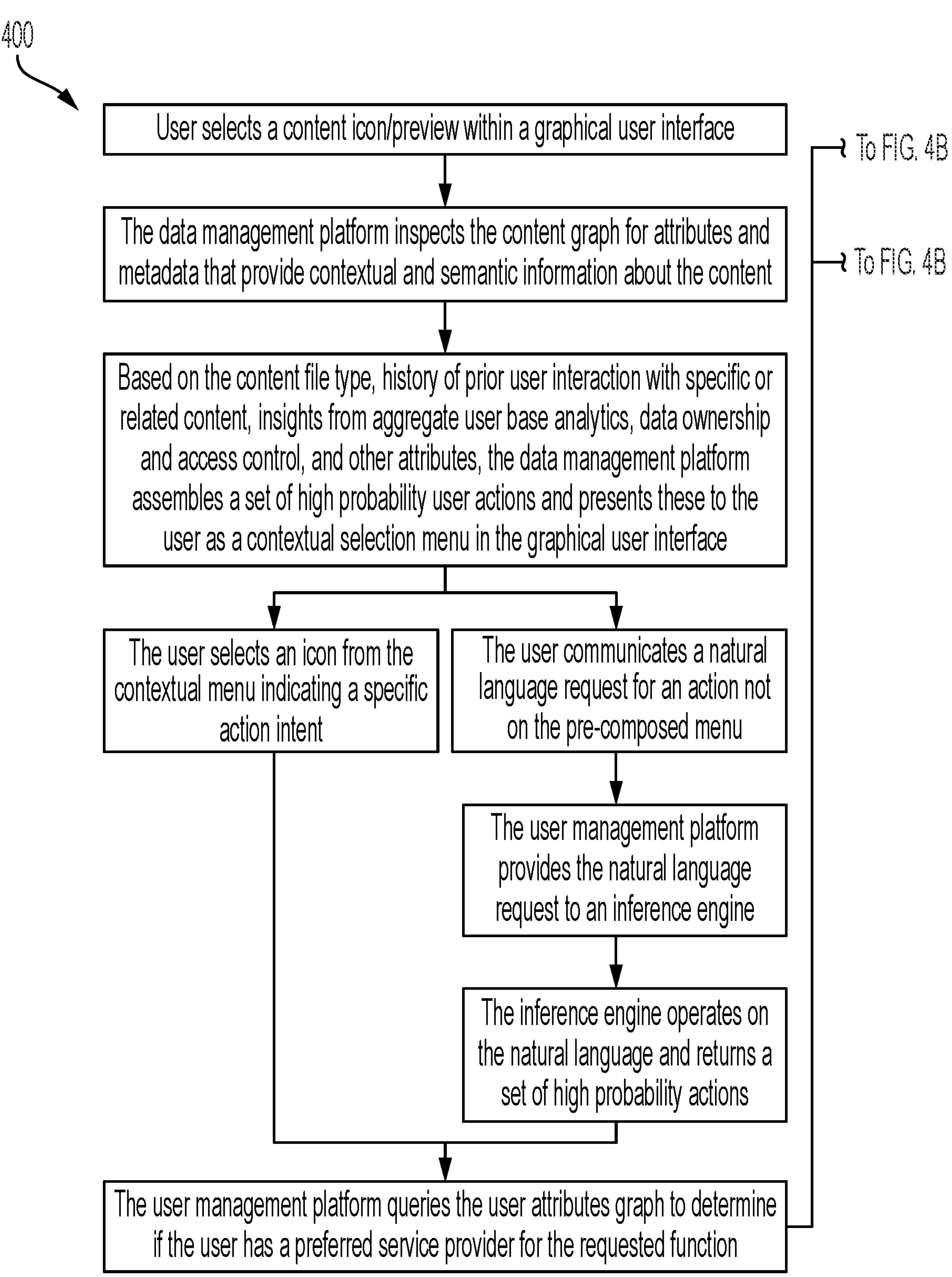
FIGS. 4A-4C are an operational flow diagram illustrating an alternative method for interfacing with a plurality of cloud computing platforms to browse, select, purchase, and use services offered therein via a single point-of-use platform according to some embodiments of the disclosure.
Figure 4B:
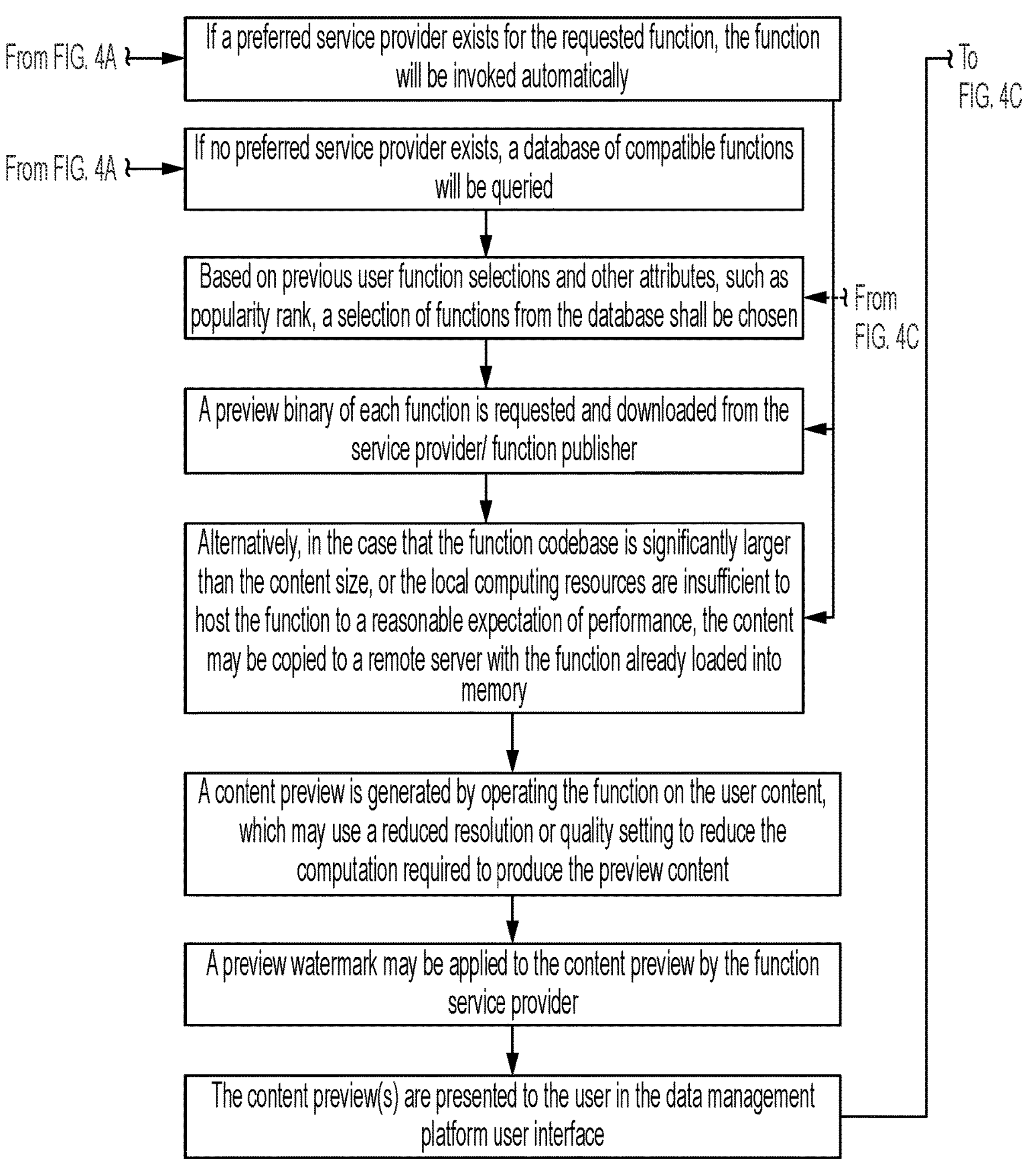
Figure 4C:
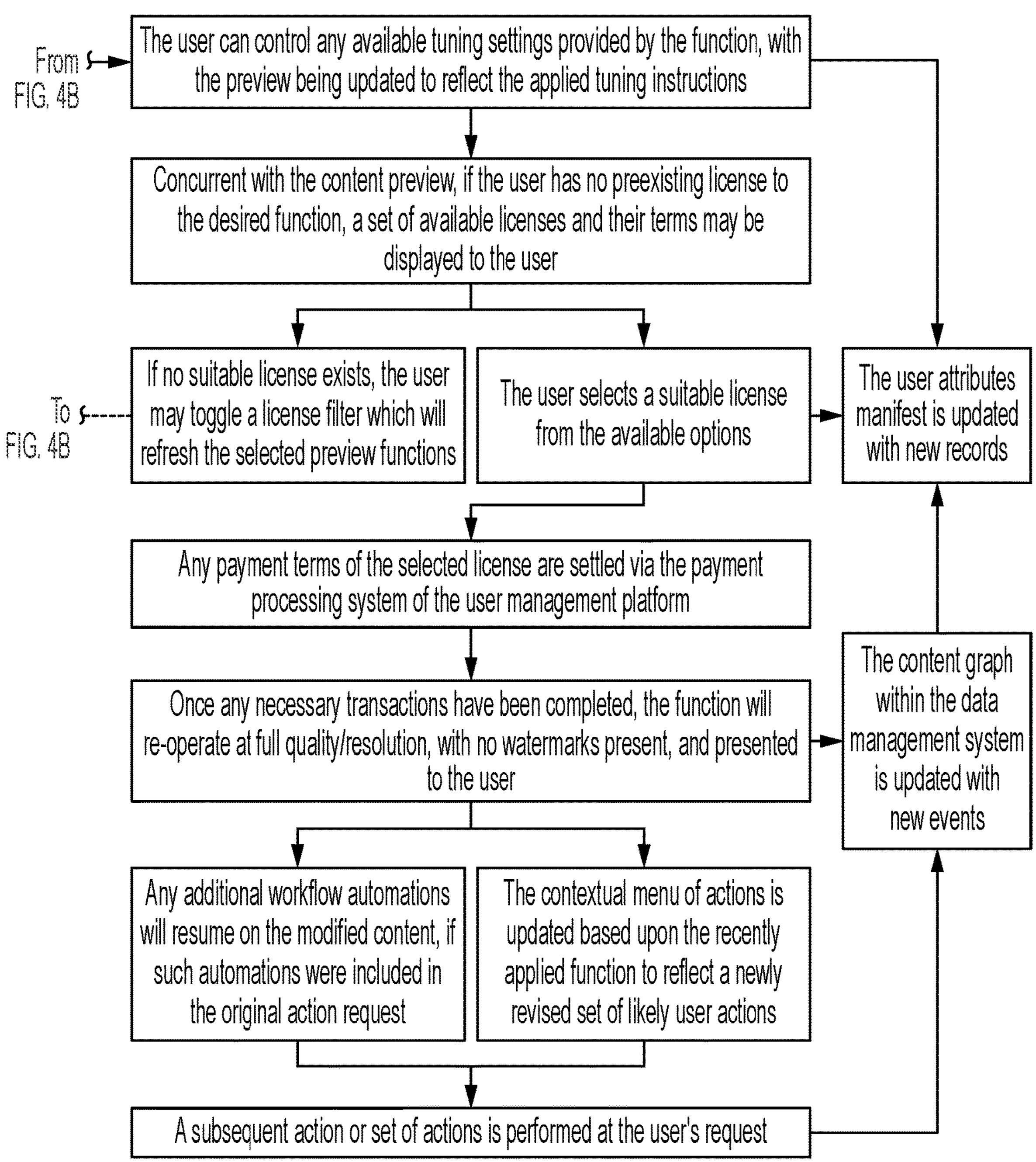

FIGS. 4A-4C are an operational flow diagram that illustrates a method 400 which is an example of an alternate embodiment of method 120.

These example embodiments describe and illustrate various systems and methods for interfacing with a plurality of cloud computing platforms to browse, select, purchase, and use services offered therein via a single point-of-use platform implemented on an information handling system.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example configuration of an information handling system is described with reference to FIG. 5.

Figure 5:
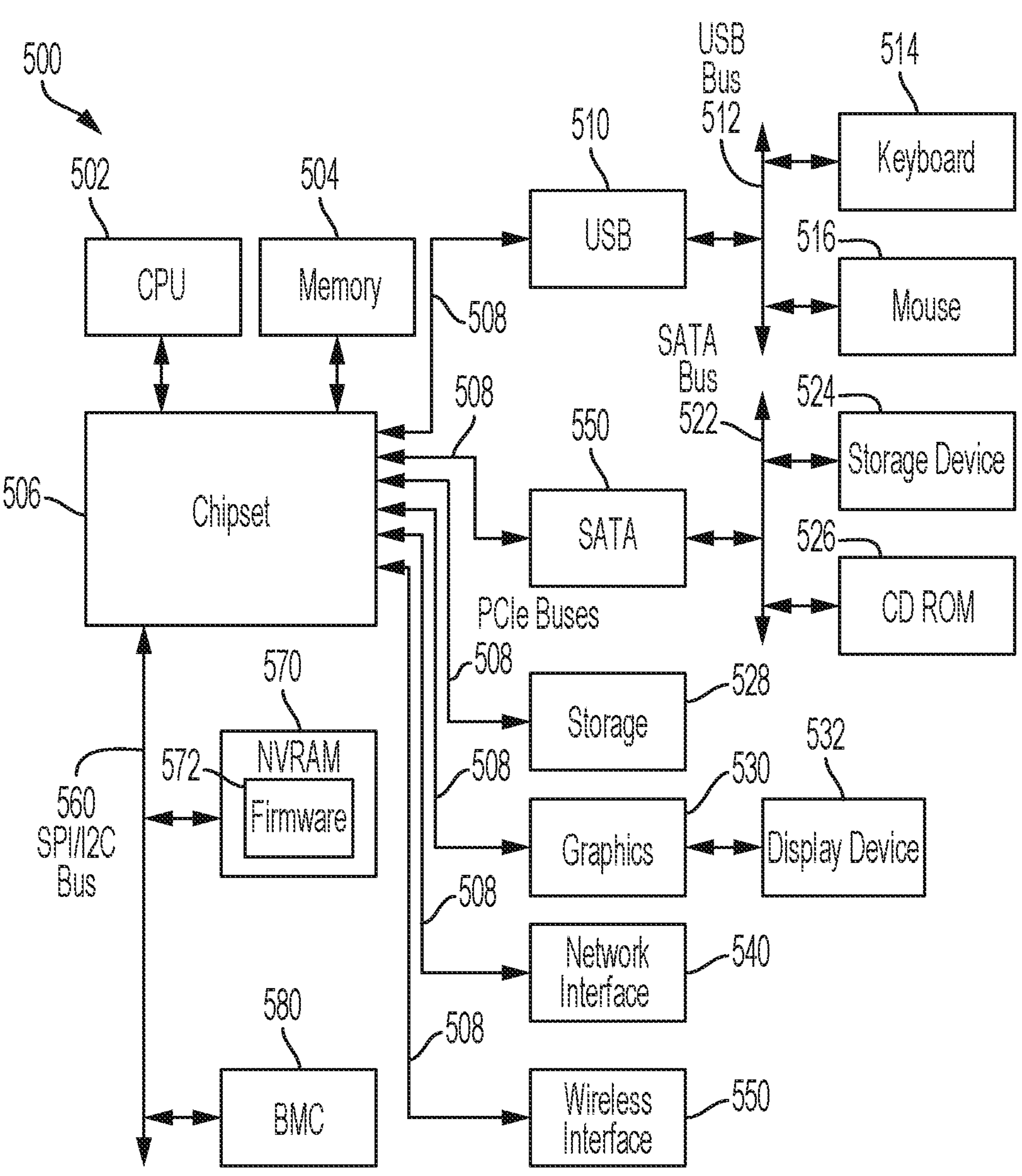
FIG. 5 is a schematic block diagram of an example information handling system according to some embodiments of the disclosure.

FIG. 5 illustrates an example information handling system 500. Information handling system 500 may include a processor 502 (e.g., a central processing unit (CPU)), a memory (e.g., a dynamic random-access memory (DRAM)) 504, and a chipset 506. In some embodiments, one or more of the processor 502, the memory 504, and the chipset 506 may be included on a motherboard (also referred to as a mainboard), which is a printed circuit board (PCB) with embedded conductors organized as transmission lines between the processor 502, the memory 504, the chipset 506, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 502, the memory 504, the chipset 506, and/or other components may be organized as a System on Chip (SoC).

The processor 502 may execute program code by accessing instructions loaded into memory 504 from a storage device, executing the instructions to operate on data also loaded into memory 504 from a storage device, and generate output data that is stored back into memory 504 or sent to another component. The processor 502 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 502 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 506 may facilitate the transfer of data between the processor 502, the memory 504, and other components. In some embodiments, chipset 506 may include two or more integrated circuits (ICs), such as a northbridge controller coupled to the processor 502, the memory 504, and a southbridge controller, with the southbridge controller coupled to the other components such as USB 510, SATA 520, and PCIe buses 508. The chipset 506 may couple to other components through one or more PCIe buses 508.

Some components may be coupled to one bus line of the PCIe buses 508, whereas some components may be coupled to more than one bus line of the PCIe buses 508. One example component is a universal serial bus (USB) controller 510, which interfaces the chipset 506 to a USB bus 512. A USB bus 512 may couple input/output components such as a keyboard 514 and a mouse 516, but also other components such as USB flash drives, or another information handling system. Another example component is a SATA bus controller 520, which couples the chipset 506 to a SATA bus 522. The SATA bus 522 may facilitate efficient transfer of data between the chipset 506 and components coupled to the chipset 506 and a storage device 524 (e.g., a hard disk drive (HDD) or solid-state disk drive (SDD)) and/or a compact disc read-only memory (CD-ROM) 526. The PCIe bus 508 may also couple the chipset 506 directly to a storage device 528 (e.g., a solid-state disk drive (SDD)). A further example of an example component is a graphics device 530 (e.g., a graphics processing unit (GPU)) for generating output to a display device 532, a network interface controller (NIC) 540, and/or a wireless interface 550 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 506 may also be coupled to a serial peripheral interface (SPI) and/or Inter-Integrated Circuit (I2C) bus 560, which couples the chipset 506 to system management components. For example, a non-volatile random-access memory (NVRAM) 570 for storing firmware 572 may be coupled to the bus 560. As another example, a controller, such as a baseboard management controller (BMC) 580, may be coupled to the chipset 506 through the bus 560. BMC 580 may be referred to as a service processor or embedded controller (EC). Capabilities and functions provided by BMC 580 may vary considerably based on the type of information handling system. For example, the term baseboard management system may be used to describe an embedded processor included at a server, while an embedded controller may be found in a consumer-level device. As disclosed herein, BMC 580 represents a processing device different from processor 502, which provides various management functions for information handling system 500. For example, an embedded controller may be responsible for power management, cooling management, and the like. An embedded controller included at a data storage system may be referred to as a storage enclosure processor or a chassis processor.

System 500 may include additional processors that are configured to provide localized or specific control functions, such as a battery management controller. Bus 560 can include one or more busses, including a Serial Peripheral Interface (SPI) bus, an Inter-Integrated Circuit (I2C) bus, a system management bus (SMBUS), a power management bus (PMBUS), or the like. BMC 580 may be configured to provide out-of-band access to devices at information handling system 500. Out-of-band access in the context of the bus 560 may refer to operations performed prior to execution of firmware 572 by processor 502 to initialize operation of system 500.

Firmware 572 may include instructions executable by processor 102 to initialize and test the hardware components of system 500. For example, the instructions may cause the processor 502 to execute a power-on self-test (POST). The instructions may further cause the processor 502 to load a boot loader or an operating system (OS) from a mass storage device. Firmware 572 additionally may provide an abstraction layer for the hardware, such as a consistent way for application programs and operating systems to interact with the keyboard, display, and other input/output devices. When power is first applied to information handling system 500, the system may begin a sequence of initialization procedures, such as a boot procedure or a secure boot procedure. During the initialization sequence, also referred to as a boot sequence, components of system 500 may be configured and enabled for operation and device drivers may be installed. Device drivers may provide an interface through which other components of the system 500 can communicate with a corresponding device. The firmware 572 may include a basic input-output system (BIOS) and/or include a unified extensible firmware interface (UEFI). Firmware 572 may also include one or more firmware modules of the information handling system. Additionally, configuration settings for the firmware 572 and firmware of the information handling system 500 may be stored in the NVRAM 570. NVRAM 570 may, for example, be a non-volatile firmware memory of the information handling system 500 and may store a firmware memory map namespace 500 of the information handling system. NVRAM 570 may further store one or more container-specific firmware memory map namespaces for one or more containers concurrently executed by the information handling system.

Information handling system 500 may include additional components and additional busses, not shown for clarity. For example, system 500 may include multiple processor cores (either within processor 502 or separately coupled to the chipset 506 or through the PCIe buses 508), audio devices (such as may be coupled to the chipset 506 through one of the PCIe busses 508), or the like. While a particular arrangement of bus technologies and interconnections is illustrated for the purpose of example, one of skill will appreciate that the techniques disclosed herein are applicable to other system architectures. System 500 may include multiple processors and/or redundant bus controllers. In some embodiments, one or more components may be integrated together in an integrated circuit (IC), which is circuitry built on a common substrate. For example, portions of chipset 506 can be integrated within processor 502. Additional components of information handling system 500 may include one or more storage devices that may store machine-executable code, one or more communications ports for communicating with external devices, and various input and output (I/O) devices, such as a keyboard, a mouse, and a video display.

In some embodiments, processor 502 may include multiple processors, such as multiple processing cores for parallel processing by the information handling system 500. For example, the information handling system 500 may include a server comprising multiple processors for parallel processing. In some embodiments, the information handling system 500 may support virtual machine (VM) operation, with multiple virtualized instances of one or more operating systems executed in parallel by the information handling system 500. For example, resources, such as processors or processing cores of the information handling system may be assigned to multiple containerized instances of one or more operating systems of the information handling system 500 executed in parallel. A container may, for example, be a virtual machine executed by the information handling system 500 for execution of an instance of an operating system by the information handling system 500. Thus, for example, multiple users may remotely connect to the information handling system 500, such as in a cloud computing configuration, to utilize resources of the information handling system 500, such as memory, processors, and other hardware, firmware, and software capabilities of the information handling system 500. Parallel execution of multiple containers by the information handling system 500 may allow the information handling system 500 to execute tasks for multiple users in parallel secure virtual environments.

The schematic flow chart diagram of FIG. 1B or flow chart diagrams of FIGS. 2 and 3 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:

receiving, by an information handling system, a request from a user to perform an action;

determining, by the information handling system, a list of one or more software functions, configured to at least partially perform the action, of a plurality of cloud computing platforms using an application programming interface (API) configured to integrate with each of the plurality of cloud computing platforms;

retrieving, by the information handling system, from the plurality of cloud computing platforms, using the API, one or more licensing term options associated with each of the one or more software functions, wherein each of the one or more licensing term options pertains to a use of an associated software function to at least partially perform the action;

receiving, by the information handling system from the user, target content on which the action is to be at least partially performed;

transmitting, by the information handling system to the user, one or more previews of outputs resulting from each of the one or more software functions at least partially performing the action;

receiving, by the information handling system from the user, a first selection of at least one selected software function from the list of the one or more software functions and a second selection of a selected licensing term option from the one or more licensing term options associated with the at least one selected software function;

receiving, by the information handling system from the user, payment details in accordance with the second selection; and causing, by the information handling system, the action to be at least partially performed by the at least one selected software function using the API in response to receiving the first selection and the payment details, wherein:

transmitting the one or more previews includes generating, by the information handling system, each of the one or more previews, prior to receiving the first selection and the payment details, by causing, using the API, the action to be at least partially performed on a reduced resolution version of the target content by each of the one or more software functions in a virtual environment; and causing the action includes causing the action to be at least partially performed on a full resolution version of the target content by the at least one selected software function using the API in response to receiving the first selection and the payment details.

2. The method of claim 1 further comprising displaying, by the information handling system, a list of one or more potential actions and wherein receiving the request to perform the action comprises receiving, from the user, a selection of the action from the list of the one or more potential actions.

3. The method of claim 2, further comprising:

receiving, by the information handling system from the user, a natural language description of a desired action;

determining, by the information handling system using an inference engine, one or more probable actions each having a probability of matching the desired action that surpasses a probability threshold; and generating, by the information handling system, the list of the one or more potential actions such that the one or more potential actions comprise the one or more probable actions.

4. The method of claim 1, wherein the list of the one or more software functions is curated based on at least one known preference of the user for a preferred software function publisher, a history of software functions selected by the user, or a combination thereof.

5. The method of claim 1, wherein the action comprises a natural language description of a software design pattern, and wherein the one or more previews, comprising code-implementation examples of the software design pattern having imposed utility limitations, are retrieved from the plurality of cloud computing platforms using the API.

6. The method of claim 1, wherein the target content comprises a digital image, and wherein the action comprises applying a visual effect filter to the digital image.

7. The method of claim 1, wherein the target content comprises a digital document, and wherein the action comprises applying an electronic signature to the digital document.

8. The method of claim 1, wherein at least one of the one or more previews is configured to update dynamically in response to one or more tuning inputs received from the user.

9. An information handling system, comprising:

a memory; and at least one processor, wherein the at least one processor is configured to perform the steps comprising:

receiving a request from a user to perform an action;

determining a list of one or more software functions, configured to at least partially perform the action, of a plurality of cloud computing platforms using an application programming interface (API) configured to integrate with each of the plurality of cloud computing platforms;

retrieving from the plurality of cloud computing platforms, using the API, one or more licensing term options associated with each of the one or more software functions, wherein each of the one or more licensing term options pertains to a use of an associated software function to at least partially perform the action;

receiving, from the user, target content on which the action is to be at least partially performed;

transmitting one or more previews of outputs resulting from each of the one or more software functions at least partially performing the action;

receiving, from the user, a first selection of at least one selected software function from the list of the one or more software functions and a second selection of a selected licensing term option from the one or more licensing term options associated with the at least one selected software function;

receiving, from the user, payment details in accordance with the second selection; and causing the action to be at least partially performed by the at least one selected software function using the API in response to receiving the first selection and the payment details, wherein:

transmitting the one or more previews includes generating each of the one or more previews, prior to receiving the first selection and the payment details, by causing, using the API, the action to be at least partially performed on a reduced resolution version of the target content by each of the one or more software functions in a virtual environment; and causing the action includes causing the action to be at least partially performed on a full resolution version of the target content by the at least one selected software function using the API.

10. The information handling system of claim 9, wherein the processor is further configured to display a list of one or more potential actions and wherein receiving the request to perform the action comprises receiving, from the user, a selection of the action from the list of the one or more potential actions.

11. The information handling system of claim 10, wherein the at least one processor is further configured to perform steps comprising:

receiving, from the user, a natural language description of a desired action;

determining, using an inference engine, one or more probable actions each having a probability of matching the desired action that surpasses a probability threshold; and generating the list of the one or more potential actions such that the one or more potential actions comprise the one or more probable actions.

12. The information handling system of claim 8, wherein the list of the one or more software functions is curated based on at least one known preference of the user for a preferred software function publisher, a history of software functions selected by the user, or a combination thereof.

13. The information handling system of claim 8, wherein the action comprises a natural language description of a software design pattern, and wherein the one or more previews, comprising code-implementation examples of the software design pattern having imposed utility limitations, are retrieved from the plurality of cloud computing platforms using the API.

14. A computer product, comprising:

a non-transitory computer readable medium comprising instructions to perform steps comprising:

receiving a request from a user to perform an action;

determining a list of one or more software functions, configured to at least partially perform the action, of a plurality of cloud computing platforms using an application programming interface (API) configured to integrate with each of the plurality of cloud computing platforms;

retrieving from the plurality of cloud computing platforms, using the API, one or more licensing term options associated with each of the one or more software functions, wherein each of the one or more licensing term options pertains to a use of an associated software function to at least partially perform the action;

receiving, from the user, target content on which the action is to be at least partially performed;

transmitting one or more previews of outputs resulting from each of the one or more software functions at least partially performing the action;

receiving, from the user, a first selection of at least one selected software function from the list of the one or more software functions and a second selection of a selected licensing term option from the one or more licensing term options associated with the at least one selected software function; receiving, from the user, payment details in accordance with the second selection; and causing the action to be at least partially performed by the at least one selected software function using the API in response to receiving the first selection and the payment details, wherein:

transmitting the one or more previews includes generating each of the one or more previews, prior to receiving the first selection and the payment details, by causing, using the API, the action to be at least partially performed on a reduced resolution version of the target content by each of the one or more software functions in a virtual environment; and causing the action includes causing the action to be at least partially performed on a full resolution version of the target content by the at least one selected software function using the API in response to receiving the first selection and the payment details.

15. The computer product of claim 14, wherein the non-transitory computer readable medium further comprises instructions to perform steps comprising:

receiving, from the user, a natural language description of a desired action;

determining, using an inference engine, one or more probable actions each having a probability of matching the desired action that surpasses a probability threshold; and generating a list of the one or more probable actions wherein receiving the request to perform the action comprises receiving, from the user, a selection of the action from the list of the one or more probable actions.

16. The computer product of claim 14, wherein the list of the one or more software functions is curated based on at least one known preference of the user for a preferred software function publisher, a history of software functions selected by the user, or a combination thereof.

17. The computer product of claim 14, wherein the action comprises a natural language description of a software design pattern, and wherein the one or more previews, comprising code-implementation examples of the software design pattern having imposed utility limitations, are retrieved from the plurality of cloud computing platforms using the API.

* * * * *